US006860283B1

(12) United States Patent
Finkeldei et al.

(10) Patent No.: US 6,860,283 B1
(45) Date of Patent: Mar. 1, 2005

(54) METHOD OF CLEANING VALVES OR LINES

(75) Inventors: Ferdinand Finkeldei, Frankfurt am Main (DE); Walter Schnaus, Rodenbach (DE)

(73) Assignee: Lurgi Zimmer AG, Frankfurt am Main (DE)

( * ) Notice: Subject to any disclaimer, the term of this patent is extended or adjusted under 35 U.S.C. 154(b) by 195 days.

(21) Appl. No.: 10/018,560

(22) PCT Filed: Jun. 23, 2000

(86) PCT No.: PCT/EP00/05874

§ 371 (c)(1), (2), (4) Date: Dec. 17, 2001

(87) PCT Pub. No.: WO01/00339

PCT Pub. Date: Jan. 4, 2001

(30) Foreign Application Priority Data

Jun. 24, 1999 (DE) ........................................ 199 28 859

(51) Int. Cl.[7] ............................. B08B 3/00; B08B 3/04; F16K 51/00

(52) U.S. Cl. ................................ 137/15.04; 134/22.15; 137/15.06; 137/241

(58) Field of Search ........................... 134/22.11, 22.12, 134/22.13, 22.15, 30, 34, 37, 38, 102.1, 166 C; 137/15.05, 15.06, 238, 240, 241; 222/148

(56) References Cited

U.S. PATENT DOCUMENTS 3,648,717 A * 3/1972 Wiggins ..................... 137/240
4,022,512 A * 5/1977 Autelli ....................... 137/240
4,196,268 A * 4/1980 Brown et al. ............... 521/130
4,614,661 A * 9/1986 White et al. ................ 426/511
4,913,185 A * 4/1990 Mattei ........................ 137/241
5,226,449 A * 7/1993 Zimmerly ................... 137/240
5,232,023 A * 8/1993 Zimmerly ................... 137/240
5,302,192 A * 4/1994 McLearie et al. ........ 106/18.33
5,318,637 A 6/1994 Wernicke ................. 134/22.11
5,452,746 A 9/1995 Hoobyar et al. ............ 137/886
5,910,420 A * 6/1999 Tuompo et al. ............... 435/18
6,056,003 A * 5/2000 Madsen et al. ............. 137/240
6,558,613 B1 * 5/2003 Gauckler et al. ........... 264/669

FOREIGN PATENT DOCUMENTS

DE 196 49 013 5/1998 ........... B29B/13/10

* cited by examiner

*Primary Examiner*—George L. Walton
(74) *Attorney, Agent, or Firm*—Norris McLaughlin & Marcus

(57) ABSTRACT

Method of cleaning valves or lines through which hydrolysable polymers are transported at the operating temperature, in which, after the polymer stream has been shut off and the polymer has been evacuated as far as possible, steam is passed through the valves or lines to be cleaned while the operating temperature is maintained at plus/minus 10° C., with the steam being introduced via hydrolysis valves set in the wall of the valve housing or the lines and discharged via emptying apertures.

6 Claims, 2 Drawing Sheets

METHOD OF CLEANING VALVES OR LINES

This is a 371 of PCT/EP00/05874 filed 23 Jun. 2000 (international filing date).

BACKGROUND OF THE INVENTION

The present invention relates to a method of cleaning valves or lines through which hydrolysable polymers are transported at the operating temperature.

The term "hydrolysable polymers" here is taken to mean thermoplastic polyesters, polyamides or polycarbonates, such as polyethylene terephthalate or naphthalate, polypropylene terephthalate or naphthalate, polybutylene terephthalate or naphthalate, polyamide 6 or 6.6, poly(bisphenol A carbonate) or copolymers thereof.

The preparation and processing of polymer melts or high-viscosity polymer solutions frequently requires the polymer stream to be split into sub-streams, for example if a plurality of processing positions are connected simultaneously. The flow splitting is usually carried out by means of a plurality of valves, where each individual valve may be closed or open intermittently. In order to maintain the flowability of the polymer solutions and particularly of the polymer melts, high operating temperatures of up to about 300° C. are necessary, resulting, with the valve closed, in decomposition of the polymer residues remaining in the valve to give carbon-like products. Even closed polymer valves may develop leaks at the seats due to design and production flaws and damage during start-up or in operation. This may result in total blockage of the following line. After a re-start, the polymer decomposition products are entrained by the polymer stream, contaminating the fresh polymer, which then inevitably has to be discarded or at best can be converted into low-quality products.

It is known that polymer filters can be cleaned by treatment with steam (DE 196 49 013 A) or a mixture of steam and an oxidising gas (EP 0 791 386 A) in the filter housing or in a closed tank after removal. However, the cleaning does not extend to the polymer valves and lines adjacent to the filter, which instead have to be uncoupled from the cleaning of the filter to be cleaned.

The object of the present invention is to indicate a method which enables the cleaning of valves or lines for hydrolysable polymers, where the cleaning should be carried out as far as possible in the installed state, without extensive assembly work.

SUMMARY OF THE INVENTION

This object is achieved in accordance with the invention by a method of the type mentioned at the outset which is characterised in that, after the polymer stream has been shut off and the polymer has been evacuated as far as possible, steam is passed through the valves or lines to be cleaned while the operating temperature is maintained at plus/minus 10° C., with the steam being introduced via hydrolysis valves set in the wall of the valve housing or the lines and discharged via emptying apertures.

The invention is based on the knowledge that the polymers mentioned at the outset can be hydrolysed using steam at a high temperature in the range from about 120 to 350° C. Since the operating temperature of the polymer valves or lines is in the same region, separate temperature adjustment is unnecessary. It is sufficient to continue the normal heating of the valves or lines, usually jacket heating by means of heat-transfer fluid, without interruption, which results in a temperature which is approximately the same as the operating temperature plus/minus 10° C. automatically becoming established. The amount of steam needed is small. The amount of steam is preferably kept just sufficiently large that the product line is not cooled, but hydrolysis is maintained. For example, steam at 6 bar, which is usually readily available in production plants, can be employed after appropriate decompression, preferably to 1–2 bar absolute, particularly preferably 1.0–1.3 bar. Instead of steam, it is also possible to use a mixture of steam and the vapour of a monomer on which the polymer is based, for example ethylene glycol or diethylene glycol in the case of polyethylene terephthalate. Safety (combustibility) and environmental (waste water) considerations should, however, be considered here. The hydrolysis is preferably carried out in the absence of oxygen. Alternatively, depending on the polymer, the presence of oxygen may be tolerated or even be desired (hydrolytic-oxidative decomposition).

DETAILED DESCRIPTION

The hydrolysis products, i.e. the cleavage products of the polymer, such as oligomers, monomers and decomposition products thereof, are partly discharged together with the steam, partly together with its condensate via an emptying aperture. Suitable emptying apertures are the venting and emptying devices which are usually present anyway, such as valves or closable lines. In the case of the cleaning of polymer valves, the emptying port is advantageously in the polymer line emanating from the valve. The steam feed is continued until the condensate of the exiting steam is free from hydrolytic degradation products of the polymer, which is normally the case after 24 hours at the latest. Visual assessment of the condensate is sufficient for this purpose. If the cleaning is due to a leaky valve, the steam feed is of course continued until the time of repair.

The method according to the invention is explained in greater detail below with reference to

BRIEF DESCRIPTION OF THE DRAWINGS

FIG. 1 shows as an example an alternating distributor for polymer melts. This essentially consists of the distribution chamber (1), which is connected to the product line (2), and two product valves (3) operated alternately. Each product valve (3) consists of a housing (4) which is designed as a guide cylinder and has a housing enlargement (5) on the side opposite the branching-off of the product line (6), and a valve piston (7), which is movable in the axial direction in the guide cylinder and has a valve block (8), which, in the closed valve position, engages in the valve seat (9), and a mushroom-shaped valve block headpiece (11). The polymer melt flows from the product line (2), after deflection of the flow by the mushroom-shaped headpiece (11), to the opened product valve (3), here the left-hand valve, and finally to the product line (6). The opposite flow course from the product line (6) to the product line (2) is also possible. At all times, one of the product valves (3) is opened and the other, here the right-hand valve, is closed. Without the steam feed according to the invention, the polymer residues originating from the preceding operation would decompose and gradually carbonise in the product valve (3), which is closed, but continues to be heated via the heating jacket (12). It is not sensible to switch off the heating since otherwise the polymer residues in the valve would freeze, and is not possible anyway, at least with respect to the valve region adjacent to the distribution chamber (1), since the entire distribution chamber (1) must continue to be held at the operating temperature.

Figure 1:
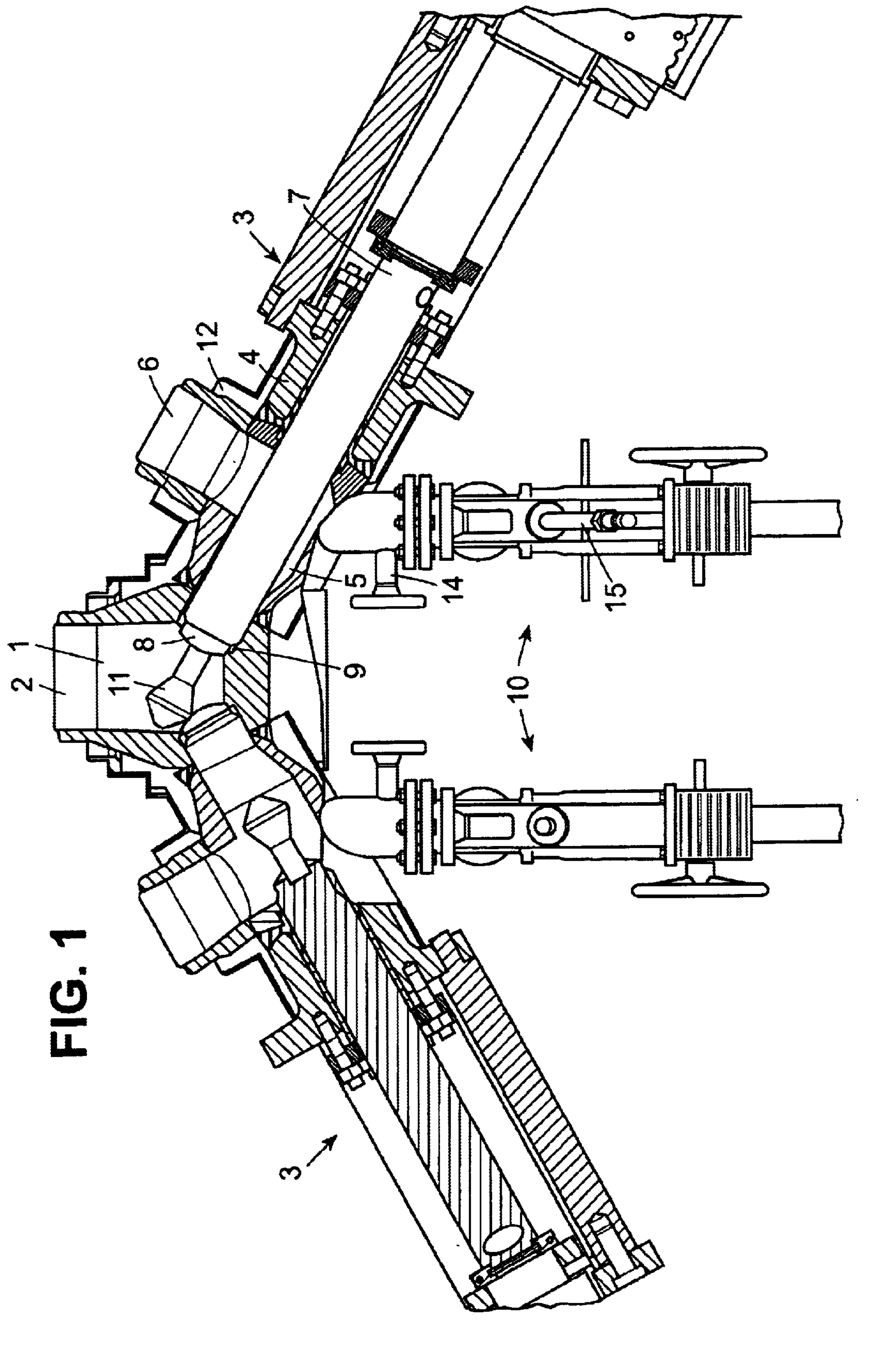
FIG. 1, which shows an alternating distributor with hydrolysis valves according to the invention, and FIG. 2, which shows a hydrolysis valve from FIG. 1 in detail.

In accordance with the invention, a valve seat, into which, in the closed valve position, the valve block of the hydrolysis valve (10), which is heated by means of heat-transfer fluid via the connection port (14), engages, is set in the housing wall of the product valve (3), approximately opposite the branch-off of the product line (6), in the region of the housing enlargement (5) in the case of the valve (3) shown here. During cleaning of the closed product valve (3) or throughout the time for which the product valve (3) is closed, steam, preferably water vapour, is fed in via the connection port (15) with the hydrolysis valve (10) open. The steam flows around the valve piston (7) as far as the valve seat (9) and exits again via the product line (6) and a venting and emptying port, which is not shown here. Not only is carbonisation of the polymer residues prevented here, but these are even removed due to gradual hydrolysis, before the cleaned product valve (3) is put back into operation, firstly the hydrolysis valve (10), subsequently the condensate emptying and finally, after escape of the final residues of steam, the vents are closed.

Figure 2:
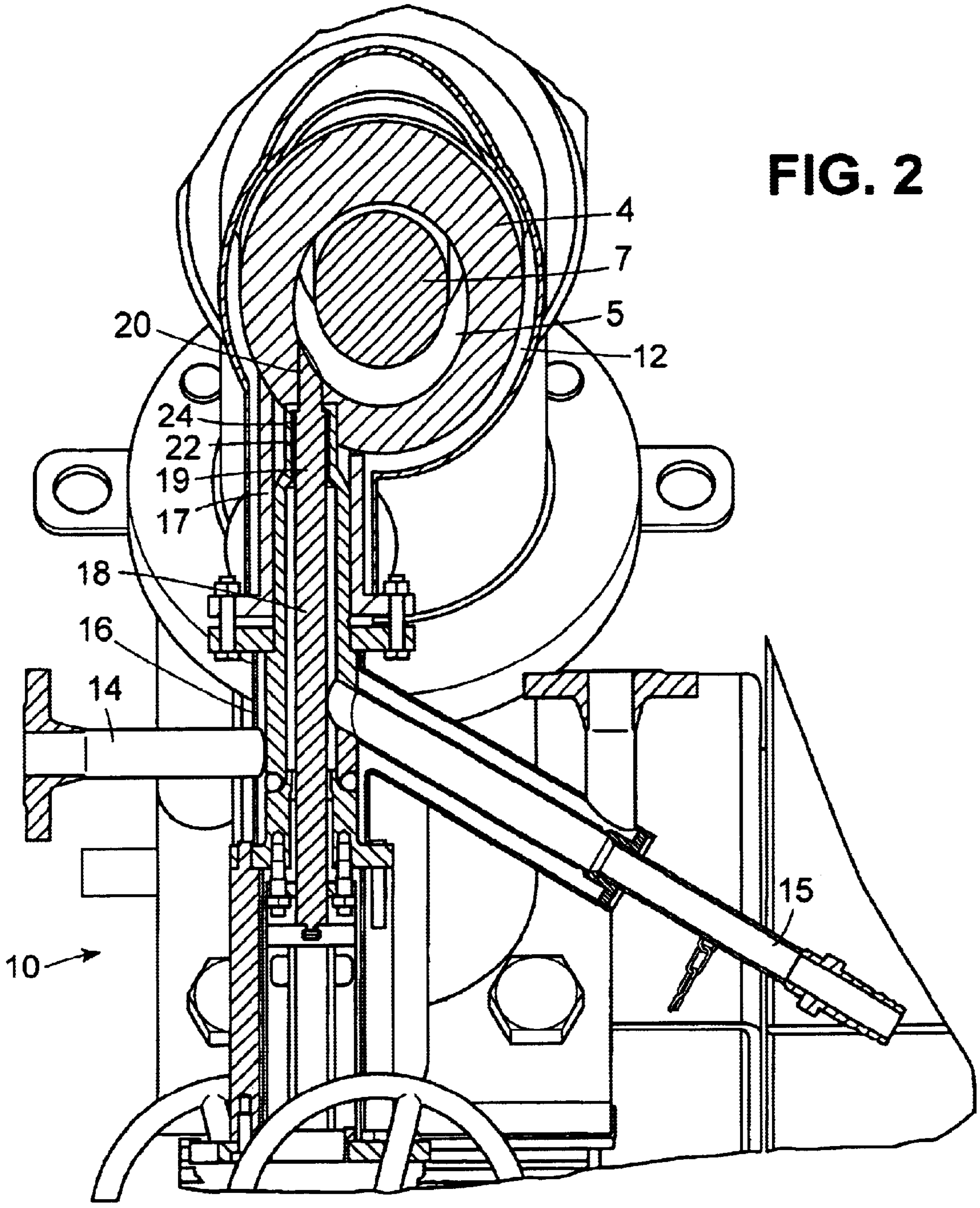

FIG. 2 shows the construction of the hydrolysis valve (10) from. FIG. 1 in detail. The hydrolysis valve (10) essentially consists of the housing (17), which is designed as a guide cylinder and heated via the heating jacket (16), and the piston (18), which is axially movable therein and whose head (19) engages into the valve seat (24) with elongated opening cone (22) in the closed position. The feed of steam takes place via the port (15) set in the housing wall (17). The valve block (19) carries a headpiece (20), which is of such a design that, with the hydrolysis valve (10) closed, the wall (4) of the product valve (3) has no dead space at the connection point. The valve block headpiece (20) is flush with the inside surface of the housing wall (4).

The hydrolysis valve (10) may also be set in the wall of a polymer line in the same manner as shown here through the example of a product valve (3). In this case, the steam does not flow around the valve piston (7), but instead flows through the polymer line as far as the venting and emptying port.

We claim:

1. Method of cleaning heated valves or heated lines through which hydrolyzable polymers are conveyed, which comprises stopping the flow of said polymers through said heated valves or heated lines, emptying said heated valves or heated lines of said polymers, passing steam through said heated valves or heated lines while heating said heated valves or heated lines to maintain the temperature of said heated valves or heated lines within ±10° C. of the temperature to which they were heated during the flow of said polymers through them, said steam being introduced via hydrolysis valves set in the walls of the valve housing of said heated valves or the walls of said heated lines and discharged via emptying apertures, wherein each of said heated valves comprises a heated housing, in the form of a guide cylinder, and is provided with a side steam supply line, a valve piston which can be moved in the axial direction in the guide cylinder, a valve block, which, in the closed position, engages into a valve seat which has an elongated opening cone and is set in the wall of the housing of the valve or line to be cleaned, and a valve block headpiece, which, in the closed valve position, terminates flush with the inside surface of the wall of the housing of the valve or line to be cleaned.

2. Method according to claim 1, wherein the supplied steam has a pressure of from 1 to 2 bar absolute.

3. Method according to claim 1, wherein the amount of steam is an amount which is sufficient to hydrolyze polymer residue in the lines or valves without cooling them.

4. Method according to claim 1, wherein the steam is passed through the valves or lines until the condensate of the steam exiting at the emptying apertures is free from hydrolytic degradation products of the polymer.

5. Method according to claim 2, wherein the steam is passed through the valves or lines until the condensate of the steam exiting at the emptying apertures is free from hydrolytic degradation products of the polymer.

6. Method according to claim 3, wherein the steam is passed through the valves or lines until the condensate of the steam exiting at the emptying apertures is free from hydrolytic degradation products of the polymer.

* * * * *